United States Patent [19]

Schefczik

[11] 3,853,911

[45] Dec. 10, 1974

[54] ARYLMERCAPTONAPHTHOLACTAMS

[76] Inventor: Ernst Schefczik, 7 Dubliner Strasse, 6700 Ludwigshafen, Germany

[22] Filed: July 11, 1973

[21] Appl. No.: 378,222

[52] U.S. Cl. ............... 260/326.5 S, 260/326.5 SA, 260/326.3
[51] Int. Cl. .......................................... C07d 27/00
[58] Field of Search............ 260/326.5 S, 326.5 SA, 260/326.3

Primary Examiner—Elbert L. Roberts
Attorney, Agent, or Firm—Johnston, Keil, Thompson & Shurtleff

[57] ABSTRACT

Naphtholactam derivatives bearing one or two arylmercapto groups. The compounds are intermediates for the production of for example disperse dyes and basic dyes.

2 Claims, No Drawings

ARYLMERCAPTONAPHTHOLACTAMS

The invention relates to compounds of the formula (I):

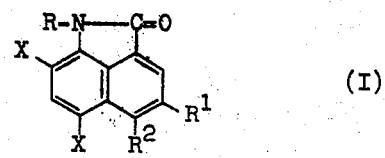

(I)

in which
R is hydrogen or unsubstituted or substituted alkyl, cycloalkyl, aralkyl or aryl;
$R^1$ is hydrogen, methoxy or ethoxy;
$R^2$ is hydrogen or methoxy;
one X has the formula —S—Ar;
the other X is hydrogen, chloro or —S—Ar;
X and $R^2$ together may be a radical of the formula:

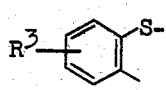

Ar is unsubstituted or substituted phenyl or naphthyl; and $R^3$ is hydrogen, alkyl or alkoxy.

Alkyl R has particularly one to eight carbon atoms and may bear for example hydroxy, alkoxy, carbalkoxy, cyano or acyloxy as a substituent. Examples of substituents for the cycloalkyl radical are alkyl groups and for the aralkyl radicals halogen, alkyl or alkoxy.

Aryl radicals may for example bear halogen, alkyl or alkoxy as substituents.

Examples of individual radicals R are: n-propyl, isopropyl, n-butyl, isobutyl, hexyl, β-ethylhexyl, β-hydroxyethyl, β-hydroxypropyl, β-methoxyethyl, β-methoxypropyl, β-ethoxyethyl, β-ethoxypropyl, cyclopentyl, cyclohexyl, methylcyclohexyl, benzyl, phenylethyl, p-methylbenzyl, methoxyphenylethyl, phenyl, chlorophenyl, methylphenyl, methoxyphenyl and ethoxyphenyl and particularly hydrogen, methyl, ethyl, β-cyanoethyl and β-carbalkoxyethyl of 1 to 4 carbon atoms in the alkoxy moiety, i.e., for example β-carbomethoxyethyl, β-carboethoxyethyl and β-carbobutoxyethyl.

Examples of radicals Ar are: phenyl, methylphenyl, methoxyphenyl, chlorophenyl, dichlorophenyl, bromophenyl, methylchlorophenyl, methoxychlorophenyl, carbalkoxyphenyl (said alkoxy having 1 to 4 carbon atoms), phenylphenyl or aminophenyl or naphthyl.

Examples of radicals $R^3$ (in addition to hydrogen) are: methyl, methoxy and ethoxy.

The new compounds are valuable intermediates for the production of dyes, particularly disperse dyes and basic dyes, which are accessible therefrom by condensation with amino compounds.

Compounds of the formula (Ia) or (Ib)

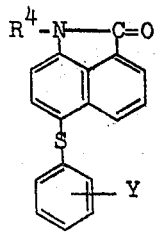
(Ia)

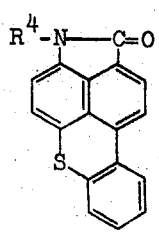
(Ib)

in which $R^4$ is hydrogen, methyl, ethyl, β-cyanoethyl or β-carboalkoxyethyl and
Y is hydrogen, chloro, methyl, methoxy or amino are of particular importance.

The new compounds may be prepared by reacting a compound of the formula (II):

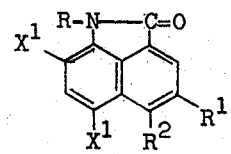

in which $X^1$ is hydrogen, chloro or bromo and at least one $X^1$ is halogen with a compound of the formula (III):

 III.

or a salt thereof, particularly an alkali metal salt of an arylthiol.

When R is hydrogen radicals R may also be introduced subsequently by alkylating agents such as esters of strong acids, epoxides or acrylic esters.

The starting materials for the production of the cyclic compounds of the formula (IV):

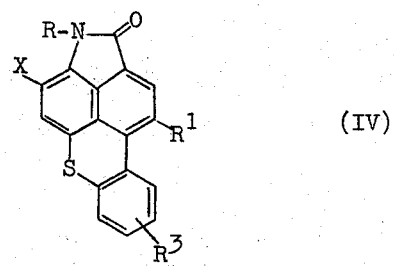
(IV)

may be the corresponding amines of the formula (V):

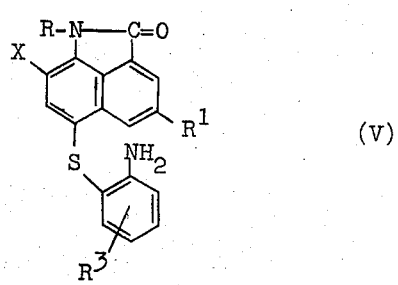
(V)

which may be converted into the cyclic compounds for example by diazotization and cyclization with elimination of nitrogen in the presence of copper salts.

Analogous reactions are known for example from German Pat. No. 1,297,259.

Details of the preparation will be found in the following examples in which parts and percentages are by weight unless otherwise stated.

EXAMPLE 1

A mixture of 500 parts by volume of N-methylpyrrolidone, 203.5 parts of 5-chloro-1,8-naphtholactam, 120 parts of thiophenol and 150 parts of anhydrous potassium carbonate is boiled under reflux for 24 hours. After cooling the reaction mixture is stirred into 1,000 parts of 5% acetic acid so that the reaction product separates as crystals. These are suction filtered, washed with water and dried. The yield is 261 parts of 5-phenylmercapto-1,8-naphtholactam having a melting point of 204° to 205°C after recrystallization from amyl alcohol.

EXAMPLE 2

248 parts of 5-bromo-1,8-naphtholactam, 138 parts of 4-methylthiophenol and 150 parts of anhydrous potassium carbonate are introduced into 600 parts by volume of N-methylpyrrolidone. The mixture is boiled for 6 hours under reflux and processed as described in Example 1. The yield is 269 parts of 5-(4'-methylphenyl)-mercapto-1,8-naphtholactam having a melting point of 202° to 203°C after recrystallization from glacial acetic acid.

EXAMPLE 3

276 parts of N-ethyl-5-bromo-1,8-naphtholactam, 135 parts of 2-aminothiophenol and 150 parts of anhydrous potassium carbonate are introduced into 500 parts of molten naphthalene. The whole is stirred for 6 hours at 200°C and then the bulk of the naphthalene is removed in a water-jet vacuum. The residue is stirred with 400 parts by volume of benzene, suction filtered and the filtered material is steamed after 50 parts of acetic acid has been added. The product is again suction filtered, washed with water and dried in vacuo at 80°C. 263 parts of N-ethyl-5-(2'-aminophenyl)-mercapto-1,8-naphtholactam is obtained having a melting point of 166° to 167°C after recrystallization from glacial acetic acid.

EXAMPLE 4

A mixture of 500 parts by volume of dimethylformamide, 301 parts of N-(2'-cyanoethyl)-5-bromo-1,8-naphtholactam, 117 parts of thiophenol and 150 parts of anhydrous potassium carbonate is boiled for 8 hours and processed as described in Example 1. 309 parts of N-(2'-cyanoethyl)-5-phenylmercapto-1,8-naphtholactam is obtained which has a melting point of 171° to 172°C after recrystallization from glacial acetic acid.

EXAMPLE 5

327 parts of 5,7-dibromo-1,8-naphtholactam, 240 parts of thiophenol and 290 parts of anhydrous potassium carbonate are introduced into 600 parts by volume of 1-chloronaphthalene. The mixture is stirred for 6 hours at 175°C and during cooling 400 parts by volume of toluene is added. After the whole has cooled it is suction filtered and the product is washed with ethanol and with 1% hydrochloric acid and dried. The yield is 374 parts of 5,7-bisphenylmercapto-1,8-naphtholactam having a melting point of 181° to 182°C after recrystallization from glacial acetic acid.

The following Table contains other compounds of the formula (VI):

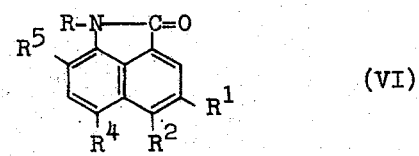

(VI)

obtained according to the methods of Examples 1 to 5:

| Example | R | R¹ | R² | R⁴ | R⁵ |
|---|---|---|---|---|---|
| 6 | H | H | H | 4-methoxyphenylmercapto | H |
| 7 | H | H | H | 4-chlorophenylmercapto | H |
| 8 | H | H | H | 4-carbomethoxyphenylmercapto | H |
| 9 | H | H | H | 2-aminophenylmercapto | H |
| 10 | H | H | H | 2-amino-5-methylphenylmercapto | H |
| 11 | H | H | H | 2-amino-6-methylphenylmercapto | H |
| 12 | H | H | H | 2-amino-5-methoxyphenylmercapto | H |
| 13 | H | H | H | 2-amino-5-ethoxyphenylmercapto | H |
| 14 | H | H | H | 2-chloro-5-trifluoromethylphenylmercapto | H |
| 15 | H | —OC₂H₅ | H | phenylmercapto | H |
| 16 | H | H | —OCH₃ | 4-chlorophenylmercapto | H |
| 17 | —CH₃ | H | H | 4-methylphenylmercapto | H |
| 18 | —CH₃ | H | H | 2-aminophenylmercapto | H |
| 19 | —CH₃ | H | H | 3-trifluoromethylphenylmercapto | H |
| 20 | —CH₃ | —OCH₃ | H | 4-methylphenylmercapto | H |
| 21 | —CH₃ | H | —OCH₃ | 4-methoxyphenylmercapto | H |
| 22 | —C₂H₅ | H | H | phenylmercapto | H |
| 23 | —C₂H₅ | H | H | 4-methylphenylmercapto | H |
| 24 | —C₂H₅ | H | H | 4-methoxyphenylmercapto | H |
| 25 | —C₂H₅ | H | H | 4-chlorophenylmercapto | H |
| 26 | —C₂H₅ | H | H | 4-acetaminophenylmercapto | H |
| 27 | —C₂H₅ | H | H | 2,5-dichlorophenylmercapto | H |
| 28 | —C₂H₅ | H | H | 4-phenylphenylmercapto | H |
| 29 | —C₂H₅ | H | H | 1-naphthylmercapto | H |
| 30 | —CH₂CH₂OCH₃ | H | H | 4-methylphenylmercapto | H |
| 31 | —CH(CH₃)₂ | H | H | phenylmercapto | H |
| 32 | —CH(CH₃)₂ | H | H | 4-chlorophenylmercapto | H |
| 33 | —C₄H₉ | H | H | 4-chlorophenylmercapto | H |
| 34 | —C₆H₁₁ | H | H | 2,5-dichlorophenylmercapto | H |
| 35 | —CH₂CH₂CN | H | H | 4-methylphenylmercapto | H |
| 36 | —CH₂CH₂CN | H | H | 2-aminophenylmercapto | H |
| 37 | —CH₂CH₂COOCH₃ | H | H | 4-methylphenylmercapto | H |

-Continued

| Example | R | R¹ | R² | R⁴ | R⁵ |
|---|---|---|---|---|---|
| 38 | —CH₂CH₂COOC₂H₅ | H | H | phenylmercapto | H |
| 39 | —CH₂CH₂COOC₂H₅ | H | H | 2-aminophenylmercapto | H |
| 40 | —CH₂CH₂COOC₄H₉(n) | H | H | phenylmercapto | H |
| 41 | —CH₂CH₂COOC₄H₉(iso) | H | H | phenylmercapto | H |
| 42 | cyclohexyl | H | H | 4-methoxyphenylmercapto | H |
| 43 | —CH₂C₆H₅ | H | H | phenylmercapto | H |
| 44 | —CH₂C₆H₅ | H | H | 2-aminophenylmercapto | H |
| 45 | —CH₂C₆H₅ | H | H | 2-amino-5-methylphenylmercapto | H |
| 46 | —CH₂C₆H₅ | H | H | 2-amino-5-methoxyphenylmercapto | H |
| 47 | —CH₂CH₂C₆H₅ | H | H | phenylmercapto | H |
| 48 | —C₆H₅ | H | H | 2-aminophenylmercapto | H |
| 49 | —C₆H₄CH₃ (p) | H | H | phenylmercapto | H |
| 50 | H | H | H | 4-methylphenylmercapto | 4-methylphenylmercapto |
| 51 | H | H | H | 4-methoxyphenylmercapto | 4-methoxyphenylmercapto |
| 52 | H | H | H | 4-chlorophenylmercapto | 4-chlorophenylmercapto |
| 53 | —CH₃ | H | H | phenylmercapto | phenylmercapto |
| 54 | —C₂H₅ | H | H | phenylmercapto | phenylmercapto |
| 55 | —C₂H₅ | H | H | 4-methylphenylmercapto | 4-methylphenylmercapto |
| 56 | —C₂H₅ | H | H | 4-methoxyphenylmercapto | 4-methoxyphenylmercapto |
| 57 | —C₂H₅ | H | H | 4-chlorophenylmercapto | 4-chlorophenylmercapto |
| 58 | —CH₂CH₂OCH₃ | H | H | phenylmercapto | phenylmercapto |
| 59 | —CH₂CH₂CN | H | H | 4-methylphenylmercapto | 4-methylphenylmercapto |
| 60 | —CH₂CH₂COOCH₃ | H | H | 4-chlorophenylmercapto | 4-chlorophenylmercapto |
| 61 | —CH₂CH₂COOC₂H₅ | H | H | phenylmercapto | phenylmercapto |
| 62 | —CH₂CH₂COOC₄H₉(iso) | H | H | phenylmercapto | phenylmercapto |

EXAMPLE 63

282.5 parts of 5-chloro-7-bromo-1,8-naphtholactam, 112 parts of thiophenol and 145 parts of anhydrous potassium carbonate are introduced into 1,200 parts by volume of dimethylformamide. The mixture is boiled under reflux for 12 hours and then 1,200 parts of 2% acetic acid is added. The deposited product is suction filtered, washed with water, dried and recrystallized from dimethylformamide. 221 parts of 5-chloro-7-phenylmercapto-1,8-naphtholactam is obtained having a melting point of 223° to 224°C, chlorine content 11.8% (calculated 11.4%).
5-phenylmercapto-7-chloro-1,8-naphtholactam may be prepared in the same way from the 5-bromo-7-chloro compound.

EXAMPLE 64

277 parts of 5-phenylmercapto-1,8-naphtholactam is dissolved in 800 parts by volume of N-methylpyrrolidone at 100°C. 1 part of hydroquinone and 20 parts of anhydrous potassium carbonate are added and then 120 parts of acrylonitrile is allowed to flow in. After stirring for 6 hours at 120°C the reaction mixture is poured onto a mixture of 500 parts of water, 500 parts of ice and 20 parts of acetic acid. The product deposited in the form of crystals is suction filtered, washed with water and dried. The yield is 326 parts of N-(2'-cyanoethyl)-5-phenylmercapto-1,8-naphtholactam having a melting point of 171° to 172°C after recrystallization from glacial acetic acid; it is identical with the compound of Example 4.

EXAMPLE 65

A solution of 385 parts of 5,7-phenylmercapto-1,8-naptholactam in 1,800 parts by volume of dimethylformamide at 100°C has successively added to it 1 part of hydroquinone, 400 parts of isobutyl acrylate and 20 parts of anhydrous potassium carbonate. The whole is kept at 100°C for 8 hours, is diluted with 700 parts by volume of methanol and is poured onto 2,000 parts of ice-cold 1% hydrochloric acid. After a conventional processing 503 parts of N-(isobutoxycarbonylethyl)-5,7-bisphenylmercapto-1,8-naphtholactam is obtained having a melting point of 109° to 110°C. The product is identical with the product of Example 62.

EXAMPLE 66

A mixture of 1,500 parts by volume of o-dichlorobenzene, 250 parts of methyl p-toluenesulfonate, 291 parts of 5-(4'-methylphenylmercapto)-1,8-naphtholactam and 200 parts of anhydrous sodium carbonate is stirred for 6 hours at 170°C. 200 parts by volume of 50% acetic acid is then added and the o-dichlorobenzene is distilled off with steam. The suspension which remains is suction filtered and the product is washed with water and dried. 299 parts of N-methyl-5-(4'-methylphenylmercapto)-1,8-naphtholactam is obtained which has a melting point of 163° to 164°C after recrystallization from acetic acid and which is identical with the compound specified in Example 17.

EXAMPLE 67

277 parts of 5-phenylmercapto-1,8-naphtholactam, 200 parts of benzyl chloride and 150 parts of anhydrous potassium carbonate are introduced into 1,500 parts by volume of dichlorobenzene. The whole is stirred for 6 hours at 170°C, 50 parts by volume of acetic acid is added and the volatile constituents are distilled off with steam. After processing 326 parts of N-benzyl-5-phenylmercapto-1,8-naphtholactam having a melting point of 117° to 118°C after recrystallization from acetic acid is obtained which is identical with the compound specified in Example 43.

EXAMPLE 68

146 parts of 5-(2'-aminophenylmercapto)-1,8-naphtolactam (Example 9) is dissolved in 1000 parts of boiling acetic acid. 250 parts of water and 150 parts of concentrated hydrochloric acid are added. The whole is then cooled to 0°C and diazotized by dripping in a solution of 35 parts of sodium nitrate in 170 parts of water. The whole is stirred for 4 hours at 0° to 5°C and the diazonium salt solution is then allowed to flow into a boiling solution of 500 parts of crystallized cupric sulfate in 5000 parts of 10% acetic acid. The whole is then boiled for 1 hour under reflux and the deposited product is suction filtered while hot and washed with hot water. After drying 136 parts of a red compound of the formula (VII) (with R = R⁶ = R⁷ = H) is obtained; after recrystallization from nitrobenzene it has a melting point of 351° to 352°C.

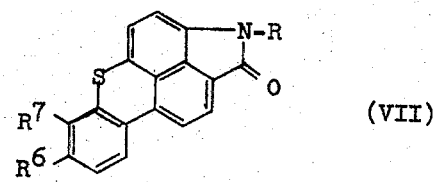

(VII)

Compounds of the formula (VII) specified in the following Table are prepared by the same method:

| Example | R | R⁶ | R⁷ |
|---|---|---|---|
| 69 | H | —CH₃ | H |
| 70 | H | H | —CH₃ |
| 71 | H | —OCH₃ | H |
| 72 | H | —OC₂H₅ | H |
| 73 | —CH₃ | H | H |
| 74 | —C₂H₅ | H | H |
| 75 | —CH₂—CH₂OCH₃ | H | H |
| 76 | —CH₂(CH₃)₂ | H | H |
| 77 | —C₄H₉ | H | H |
| 78 | —CH₂CH₂CN | H | H |
| 79 | —CH₂CH₂COOCH₃ | H | H |
| 80 | —CH₂CH₂COOC₂H₅ | H | H |
| 81 | —CH₂CH₂COOC₃H₇ | H | H |
| 82 | —CH₂CH₂COOC₄H₉ | H | H |
| 83 | —CH₂C₆H₅ | H | H |
| 84 | —CH₂C₆H₅ | —CH₃ | H |
| 85 | —C₆H₅ | H | H |

EXAMPLE 86

A mixture of 400 parts by volume of o-dichlorobenzene, 55 parts of the compound of Example 68, 50 parts of methyl p-toluenesulfonate and 40 parts of anhydrous potassium carbonate is boiled for 4 hours. 40 parts of acetic acid is then added and the dichlorobenzene is distilled off with steam. The suspension is suction filtered and washed with hot water. After drying 56 parts of a red compound of the formula (VII) in which R = CH₃, R⁶ = R⁷ = H is obtained which after it has been recrystallized from chlorobenzene melts at 226°C and is identical with the compound specified in Example 73.

EXAMPLE 87

55 parts of the compound obtained according to Example 68 is dissolved in 500 parts by volume of N-methylpyrrolidone at 120°C. There are then added successively 0.2 part of hydroquinone, 24 parts of acrylonitrile and 4 parts of anhydrous potassium carbonate. The whole is stirred for 8 hours at 120°C and then poured into 2,000 parts by volume of 0.5% hydrochloric acid. The precipitate is suction filtered, washed with water and dried. 64 parts of a compound of the formula (VII) in which R = CH₂CH₂CN and R⁶ = R⁷ = H is obtained. After it has been recrystallized from amyl alcohol the red crystals melt at 229° to 230°C. The compound is identical with the compound described in Example 78.

EXAMPLE 88

40 parts of ethyl acrylate is used instead of the acrylonitrile in Example 87 and the procedure described therein is otherwise followed. 72 parts of a compound of the formula (VII) in which R = CH₂CH₂COOC₂H₅ and R⁶ = R⁷ = H is obtained. After it has been recrystallized from ethanol it has a melting point of 135° to 136°C. The product is identical with the compound of Example 80.

EXAMPLE 89

248 parts of 5-bromo-N-ethyl-1,8-naphtholactam, 170 parts of 2-thionaphthol and 150 parts of potassium carbonate are introduced into 1,000 parts by volume of dimethylformamide and the whole is boiled under reflux for 8 hours. During cooling 400 parts of 10% acetic acid is added. After cooling the product is suction filtered, washed with hot water and dried. 289 parts of 5-(naphthyl-2)-mercapto-1,8-naphtholactam is obtained having a melting point of 216°C after it has been recrystallized from acetic acid.

The following compounds are obtained analogously:

EXAMPLE 90

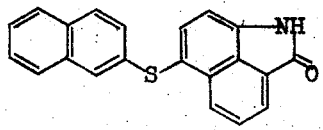

EXAMPLE 91

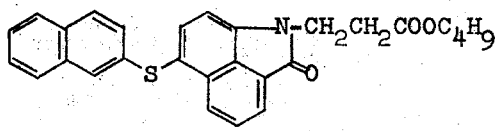

EXAMPLE 92

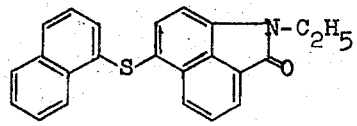

I claim:
1. An arylmercaptonaphtholactam of the formula (I):

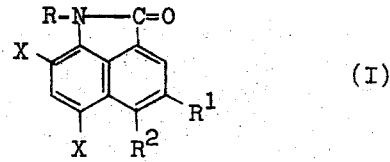

(I)

in which
R is hydrogen or unsubstituted or substituted alkyl, cycloalkyl, aralkyl or aryl;
R¹ is hydrogen, methoxy or ethoxy;
R² is hydrogen or methoxy;
one X is S—Ar; and the other X is hydrogen, chloro or S—Ar;

X and R² together may be
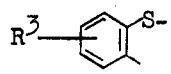
Ar is unsubstituted or substituted phenyl or naphthyl; and
R³ is hydrogen, alkyl or alkoxy.
2. A compound as claimed in claim 1 and having the formula (Ia) or (Ib):
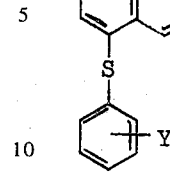 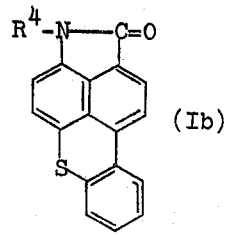
in which
R⁴ is hydrogen, methyl, ethyl, β-cyanoethyl or β-carboalkoxyethyl; and Y is hydrogen, chloro, methyl, methoxy or amino.
* * * * *

UNITED STATES PATENT AND TRADEMARK OFFICE
CERTIFICATE OF CORRECTION

PATENT NO. : 3,853,911
DATED : December 10, 1974
INVENTOR(S) : ERNST SCHEFCZIK

It is certified that error appears in the above-identified patent and that said Letters Patent are hereby corrected as shown below:

In the heading, insert--[73] Assignee: Badische Anilin- & Soda-Fabrik Aktiengesellschaft, Ludwigshafen/Rhein, Germany--;

In the heading, insert--[30] Foreign Application Priority Data, July 11, 1972, Germany, P 22 33 937.3--.

Signed and Sealed this fourth Day of November 1975

[SEAL]

Attest:

RUTH C. MASON
*Attesting Officer*

C. MARSHALL DANN
*Commissioner of Patents and Trademarks*